United States Patent [19]
Shaffer

[11] 3,735,111
[45] May 22, 1973

[54] SELECTIVE ACTUATING MECHANISM FOR PERCUSSIVE PHOTOFLASH LAMP ARRAY

[75] Inventor: John W. Shaffer, Williamsport, Pa.

[73] Assignee: GTE Sylvania Incorporated, Danvers, Mass.

[22] Filed: June 12, 1972

[21] Appl. No.: 261,588

[52] U.S. Cl. .................... 240/1.3, 95/11 L, 431/93
[51] Int. Cl. .............................................. G03b 15/02
[58] Field of Search ............................ 240/1.3, 37.1; 95/11 L; 431/92, 93, 95 R, 95 A

[56] References Cited
UNITED STATES PATENTS

| | | | |
|---|---|---|---|
| 3,452,660 | 7/1969 | Schultz et al. | 240/1.3 X |
| 3,545,904 | 12/1970 | Brandt | 240/1.3 X |
| 3,584,794 | 6/1971 | Beach | 240/1.3 |
| 3,598,984 | 8/1971 | Slomski | 240/1.3 |
| 3,630,131 | 12/1971 | Harvey | 95/11 L |

FOREIGN PATENTS OR APPLICATIONS

| | | | |
|---|---|---|---|
| 1,206,726 | 12/1965 | Germany | 431/95 |

Primary Examiner—Samuel S. Matthews
Assistant Examiner—Fred L. Braun
Attorney—Norman J. O'Malley, Edward J. Coleman and Joseph C. Ryan

[57] ABSTRACT

For a photoflash assembly comprising a plurality of percussively-ignitable flashlamps mounted on a base and arranged in a linear array with respectively associated reflectors and preenergized striker springs, a selective actuating mechanism for sequentially releasing the striker springs to fire respective flashlamps in response to successive indexing. The selective actuating mechanism comprises a slidable bar retained in a longitudinal channel in the base and having a number of linearly spaced projecting ramps. The lamps and striker springs are mounted in a row parallel to the channel with the strikers projecting over the bar to lie in the path of travel of the ramps. Linear indexing of the slidable bar along the channel causes one of the ramps to release a striker. A detent retains the position of the bar after each indexing cycle, and the sequence of releasing the strikers in response to successive indexing is programmed by the number and respective location of the ramps along the length of the bar.

15 Claims, 5 Drawing Figures

SELECTIVE ACTUATING MECHANISM FOR PERCUSSIVE PHOTOFLASH LAMP ARRAY

BACKGROUND OF THE INVENTION

This invention relates to multilamp photoflash units and, more particularly, to an array to percussively-ignitable photoflash lamps with means for selectively controlling the firing thereof.

The trend in photoflash devices has been toward the use of subminiature flashlamps (an envelope volume of less than 1 cubic centimeter) in compact, disposable, multilamp units to provide camera users with the advantages of greater convenience, compactness and portability. A currently popular flashlamp unit of this type is known generally in the trade as a flashcube, a specific embodiment of which is shown in U.S. Pat. No. 3,327,105, for example. The unit comprises a set of four flashlamps, each with its own reflector, mounted on a base and enclosed within a transparent cover, with each of the lamp-reflector assemblies facing a respective one of the four side walls of the cube. A spindle depends from the center of the flashcube base for operatively retaining the unit in a complementary receiving socket on a camera. In operation, the flashcube is sequentially rotated a quarter of a turn at a time, usually in response to each operation of the film advance mechanism of the camera, to successively place unused lamps in a firing position facing the object being photographed. Each of the flashlamps consists of an hermetically sealed, light transmitting glass envelope containing a filamentary combustible material, such as shredded zirconium foil, and a combustion supporting gas, such as oxygen. In the case of flashcubes employing electrically ignited lamps, a pair of lead-in wires pass through the lamp envelope to support therein a filament in combination with globules of ignition paste. When the flashcube is in the firing position, segments of the lead-in wires disposed outside the lamp envelope are securely engaged with electrical contacts in the camera socket, which in turn are connected by wires and a shutter actuated switch to the camera power source, usually a pair of dry cell batteries. When a photographer actuates the shutter release mechanism to "snap" a picture, he also, by the same operation, closes the electrical circuit from the batteries to the ignition system in the lamp to thereby flash the lamp. The timing of the ignition of the combustible material in the lamp is synchronized with the exposure of the film by actuation of the shutter release so that efficient utilization of the light from the flashlamp may be obtained.

A not infrequent problem that has been faced by the average amateur photographer when using a battery operated flash system, however, has been failure of the lamp to fire due to weak batteries and/or dirt or corrosion on one or more of the electrical contacts in the system. To overcome this problem and provide improved flashlamp reliability, percussive-type flashlamps have been developed which may be mechanically fired without the need for batteries. As described in U.S. Pat. No. 3,535,063, for example, such flashlamps have a mechanical primer sealed in one end of the lamp in lieu of lead-in wires. This primer may comprise a metal tube extending from the lamp envelope and a charge of fulminating material on a wire supported in the tube. Operation of the percussive flashlamp is initiated by an impact onto the tube to cause deflagration of the fulminating material up through the tube to ignite the combustible material disposed in the lamp envelope. The percussive-type lamps are also produced in subminiature envelope sizes and are employed in percussive flashcube units having respective preenergized striker springs associated with each lamp, as described in U.S. Pat. No. 3,597,604. The percussive flashcube is indexed into firing position similarly to the electrical flashcube; however, the flashlamp to be used is fired by the action of a member, associated with the camera shutter mechanism, moving up through the flashcube base to release the respective preenergized striker spring, whereby it sharply impacts against the primer tube of the lamp.

Another development in the field of multilamp flash units for providing additional convenience and flexibility is the provision of a linear or planar array of flashlamps. In such an arrangement, a plurality of lamps face in the direction of the object being photographed whereby it is possible to rapidly switch from one lamp to another or to flash more than one lamp at a time if additional light is required. Examples of previously described flashlamp arrays are provided by the following U.S. Pat. Nos.: 3,267,272; 3,430,545; 3,438,315; 3,454,756; 3,458,270; 3,473,880; 3,500,732; 3,544,251; 3,545,904; 3,443,875; 3,552,896; 3,562,508; 3,598,984; 3,598,985; 3,608,451; and 3,614,412.

All of these patents describe electrically energized flash systems with the sequence of lamp flashing being controlled by various electrical switching means including: manually controlled spring slide contacts; a rotary switch; thermally or chemically reactive switches placed in thermal proximity to the flashlamps; a switch within each lamp envelope which closes in response to firing to prepare the next lamp in sequence; a voltage surge across the lamps causes ignition of only the lamp having the lowest voltage break down characteristics; bimetallic switches; a meltable junction within each lamp envelope; and solid state switching circuits. Although providing a number of advantages, the electrical arrays are still prone to the reliability problems associated with an electrical flash system, namely, ignition failures due to weak batteries and/or dirty or corroded electrical contacts. As discussed hereinbefore, such problems have previously been overcome in flashcube units by the use of percussive lamps with associated preenergized striker springs. There appears to be no prior art, however, with respect to the packaging and operation of percussive-type flashlamps in an array configuration.

Another disadvantage of electrical arrays is the relative difficulty of maintaining the proper lamp firing sequence in the event the array is removed from a camera and subsequently replaced. To overcome this problem, the prior art, as indicated above, employs special type flashlamps or relatively complex memory circuits or switches in the camera. Such approaches are generally considered undesirable with respect to both cost and reliability.

SUMMARY OF THE INVENTION

Accordingly, it is an object of the present invention to provide an improved multiple photoflash lamp assembly which may be operated without an electrical energy source and which does not require rotation between successive flash operations.

A particular object of the invention is to provide a percussive flashlamp array having reliable and economical means for enabling rapid sequential ignition of the lamps and for providing a self-contained memory of the lamp ignition sequence.

Another object is to provide an automatic mechanism responsive to successive actuation of a camera shutter for mechanically activating in sequence a linear array of percussive flashlamps.

Briefly, these objects are attained, in a linear photoflash lamp array including a plurality of percussively ignitable flashlamps mounted in a row on a support member, along with a plurality of preenergized strikers releasable to fire the flashlamps. In accordance with the invention, the array includes a selective actuating mechanism comprising a slidable bar retained in a longitudinal channel in the support member parallel to the row of flashlamps. The slidable bar is provided with means for sequentially releasing the preenergized flashlamps to fire respective flashlamps of the array in response to successive indexing of the bar along the channel. In a specific embodiment, the strikers are mounted to project beyond the periphery of the channel and overlie the slidable bar, and the releasing means comprises one or more ramps linearly spaced along one side of the bar. In this case, the sequence of releasing the strikers is programmed by the number and respective location of the ramps.

BRIEF DESCRIPTION OF THE DRAWINGS

This invention will be more fully described hereinafter in conjunction with the accompanying drawings in which.

DESCRIPTION OF THE PREFERRED EMBODIMENT

Figure 1:
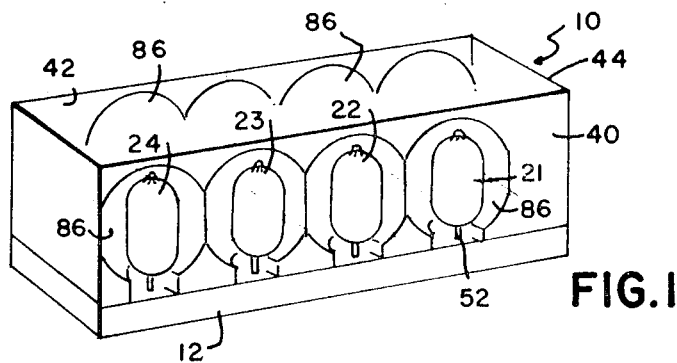
FIG. 1 is a perspective view of the exterior of a multilamp photoflash assembly including features of the invention.
Figure 3:
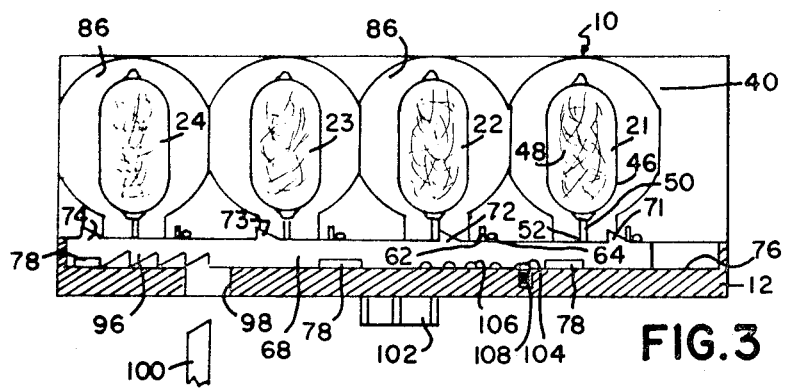
FIG. 3 is a sectional elevation on line 3—3 of FIG. 2 which illustrates the position of one of the slidable bars with respect to the associated linear array of lamps and strikers, and the aperture through which said bar may be indexed.
Figure 2:
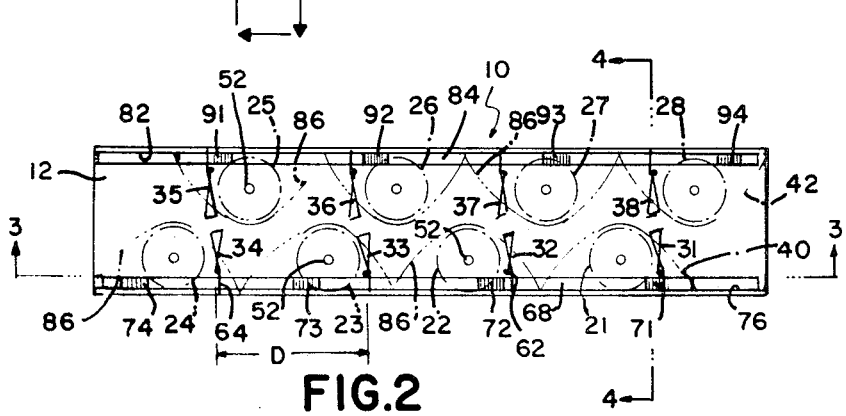
FIG. 2 is a top plan view of the photoflash assembly of FIG. 1 with a set of slidable bar actuating mechanisms according to the invention and the several spring members shown in full and the several flashlamps and reflectors shown in phantom.

In the specific embodiment illustrated in FIGS. 1–3, the photoflash assembly 10 comprises a substantially planar base, or support, member 12 having eight percussively-ignitable flashlamps 21–28 and eight respectively associated preenergized striker springs 31–38 mounted on its upper surface. The flashlamps are arranged in two parallel rows of four lamps each, and each of the preenergized striker springs is positioned in operative relationship with a respective one of the lamps. As shown in FIG. 2, the flashlamps of row 25–28 are staggered relative to the flashlamps of row 21–24, and disposed between these two rows of lamps are two arrays 40 and 42 of substantially concave reflectors arranged in a nested back-to-back relationship to face in opposite directions. To complete the unit, the assemblage of lamps, striker springs and reflectors is enclosed in a transparent cover 44 secured to the base 12.

Each of the lamps 21–28 is substantially identical and comprises (see lamp 21 of FIG. 3) an hermetically sealed light-transmitting envelope 46 having a primer depending therefrom and a filling of combustible foil 48 and a combustion-supporting gas disposed therein. The primer comprises a metal tube 50 within which a wire anvil and a charge of fulminating material are disposed. Each lamp is vertically supported in the base 12 by means of a respective bore 52 (also see FIG. 2) into which the primer tube 50 is inserted.

Figure 4:
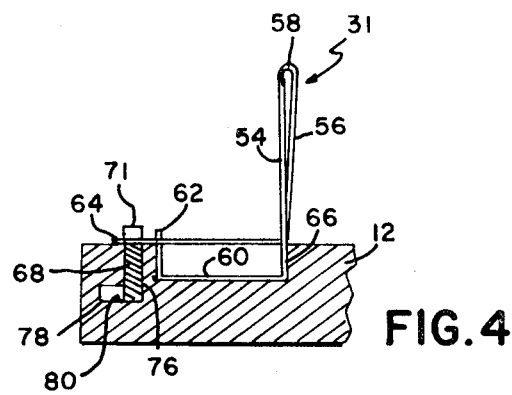
FIG. 4 is a fragmentary sectional view on line 4—4 of FIG. 2 which is somewhat enlarged and simplified to more clearly show one of the spring members and its position with respect to the slidable bar.

Each of the preenergized striker springs 31–38 is substantially identical and comprises a folded torsion device typically formed from 0.021 inch music wire about 2.5 inches long. Referring to FIG. 4, and the numerically identified elements of spring 31, the wire is shaped to form a hairpin torsional section having segments 54 and 56 joined by a bight 58. The end portion of segment 54 is shaped to define a stationary supporting foot 60, the tip of which is shaped to define a catch 62. The end portion of segment 56 is shaped to define a striker 64, which when the spring is preenergized, or cocked, as shown, crosses over the supporting foot 60 and is retained by catch 62. The stationary supporting foot 60 is seated in an elongated slot formed in the base 12, the slot being sufficiently shallow so that the catch 62 formed in the free end of foot 60 will project above the upper surface of base 12.

Initially the striker 64 may be formed at an angle of about 90° to the stationary supporting foot 60, although the angle through which the striker is rotated to position it behind catch 62, as shown may be of any value that does not cause overstressing of the wire. The base 12 is shaped to provide a suitable bearing surface 66 for the heel of the striker during cocking. This bearing surface also aids in preventing accidental displacement of the spring sufficiently to free the striker from the catch sometime after cocking and before firing is intended.

Sequential displacement of each cocked striker 64, to release it from the catch 62 and thus permit it to strike the respective primer tube 50 and fire the associated lamp, is effected by a selective actuating mechanism in accordance with the invention. Referring to FIGS. 2–4, the actuating mechanism for the row of strikers 31–34 comprises a slidable bar 68 having four linearly spaced projecting ramps 71–74 disposed along one side thereof. The bar 68 is retained in a longitudinal channel 76 in base 12 which is located parallel to the row of lamps 21–24. Each cocked striker 64 of the springs 31–34 projects beyond the periphery of channel 76 to overlie a portion of the slidable bar 68. In particular, the free end of each striker 64 is disposed to lie in the path of travel of a respective one of the ramps 71–74 on bar 68. Hence, upon translationally indexing the bar 68 along channel 76, the striker adjacent to an upcoming ramp (such a striker 64 of spring 31 is adjacent to ramp 71) is pushed upwardly by the ramp a distance sufficient to clear the top of catch 62. The striker then swings clockwise, as viewed from above, and hits and indents the impact sensitive primer tube 50 at a high velocity to cause deflagration of the fulminating material located therein and thus ignite the combustible foil 48.

Bar 68 may be retained in channel 76 by the overlying strikers 64, with the location of the ramps providing a clearance for striker overhang after the spring is released so that the bar will continue to be held in position but free to translate. Alternatively, the bar 68 may be held in the channel by means of tabs 78 which project at right angles from the bottom of the bar and engage a groove 80 (FIG. 4) along the lower portion of the sidewall of channel 76.

The preenergized striker springs 35-38 associated with lamps 25-28 are mounted in a direction opposite to that of springs 31-34, as indicated in FIG. 2. Hence, base 12 also defines a second longitudinal channel 82 adjacent to the strikers of springs 35-38 and having a periphery beyond which the cocked strikers of the springs project. Channel 82 is parallel to channel 76, and the two rows of flashlamps are parallel with and disposed between these two channels. A second slidable bar 84 having four linearly space ramps 91-94 is retained in channel 82 underlying the adjacent strikers. Bar 84 is adapted to be indexed in a direction opposite to the indexing direction of bar 68 for selectively releasing springs 35-38 in the same manner as described for the release of springs 31-34 by bar 68. That is, when base 12 is rotated 180°, bar 84 will also move from left to right.

The reflector arrays 40 and 42 are substantially identical; each comprises a strip of prefromed sheet material having a light reflective coating and defining a set of four inwardly dished, individual light reflector surfaces 86 of suitable shape for fitting about respective ones of the flashlamps. As shown in FIGS. 1 and 2, each reflector of array 40 is disposed behind a respective one of the flashlamps of row 21-24. Hence, upon ignition of one of the flashlamps 21-24, the surface 86 behind that lamp reflects light in the direction toward which the lamp-reflector unit is facing.

The four reflectors of array 42, on the other hand, are respectively disposed behind the four flashlamps of row 25-28 so as to face in the opposite direction from that of the reflectors of array 40. As illustrated by FIGS. 1 and 2, therefore, the photoflash assembly 10 comprises a symmetrical arrangement of reflectors, lamps, springs and indexable actuating bars for providing two operative flashlamp arrays facing in opposite directions. The hairpin torsional sections of the springs are located behind the reflectors (FIG. 2), with a clearance being provided along the lower edges of the reflectors to permit free operation of the strikers.

To enable indexing of the slidable bar 68 in equal increments, four evenly spaced ratchet drive teeth 96 are provided on a side of the bar diametrically opposite that on which the ramps are located. More specifically, in FIGS. 3 and 5, the ramps 71-74 are disposed along the top of the bar 68, while the ratchet drive teeth 96 are located on the bottom of the bar, as illustrated. The teeth 96 are rendered accessible to external actuating means through an aperture 98 provided in base member 12 at the bottom of channel 76 (FIG. 3). For example, translational indexing of the bar to the right may be effected by a suitable actuating member 100 moving up through aperture 98 to engage one of the teeth 96 and then moving laterally to the right to translate the bar 68 along channel 76. More specifically, member 100 pushes bar 68 to the right a distance $x$ determined by the length of aperture 98 and the spacing of drive teeth 96. This action causes one of the ramps on bar 68 to lift its associated spring striker 64 over retaining catch 62. The ramp ends at this point, and the released spring drives the striker into a lamp primer, which action flashes that lamp. Member 100 is then disengaged from the ratchet drive teeth by a downward movement and moved laterally to the left to ready it for the next indexing cycle. The square pattern of arrows below actuating member 100 in FIG. 3 illustrates this path of travel. In a typical application, actuating member 100 may be part of a camera mechanism designed to enable the photographer to flash a lamp in synchronization with the tripping of a camera shutter to take a picture.

The bottom of base 12 may be provided with suitable means for mounting the photoflash assembly 10 on apparatus such as a camera. For example, as shown in FIG. 3, a mounting post 102 may be provided which is shaped to mate with the socket on a camera, or other apparatus.

In the illustrated flash assembly 10, eight lamps are available to be sequentially flashed in response to successive indexing of the gear train by member 100. More specifically, four rapid flash exposures may be taken with a camera, expending in sequence lamps 21-24. The array is then removed from the camera, reversed, and remounted to place the unused lamps 25-28 and preenergized strikers 35-38 in position to be operated. Bar 84 is identical to bar 68, and channel 82 contains an aperture, similar to aperture 98, through which bar 84 may be indexed by member 100 in this reversed position of the assembly. Lamps 25-28 may then be sequentially fired in the same manner as lamps 21-24.

The sequence of releasing the strikers in response to successive indexing is programmed by the number and respective location of the ramps along the length of each slidable bar. In this case, four ramps on each bar are arranged so that for a selected increment $x$ of translation along the respective channel, the bar travel will cause a first ramp on that bar to release a striker and a second ramp on that bar to be moved to a position adjacent another preenergized striker. This pattern of ramp positioning then continues for all successive $x$ increments of translation until all four springs have been released.

Figure 5:
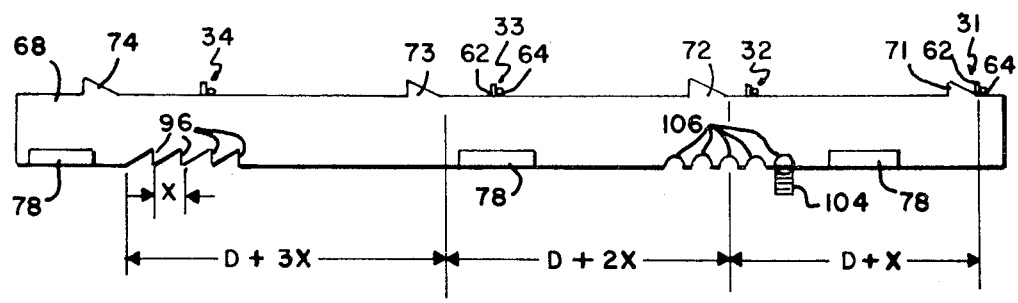
FIG. 5 is an enlarged scale detail view of the slidable bar.

For example, referring to FIGS. 3-5, according to one embodiment, the springs 31-34 are evenly spaced, with a common distance D between strikers (FIG. 2). The pitch of the ratchet drive teeth 96 is $x$ (FIG. 5), and the aperture 98 in base 12 comprises a slot parallel to channel 76 and having a length of $2x$. Each of the ramps 71-74 is adapted to release a respective one of the striker springs 31-34, and each successive ramp after the first (ramp 71) is spaced $D+(n-1)x$ from its preceeding ramp in the striker release sequence, where D is the distance between strikers, $n$ is the number of the ramp in the striker release sequence, and $x$ is the distance the slidable bar 68 translates along channel 76 during each indexing increment for release of a striker. Thus, in FIG. 5, ramp 71 is positioned adjacent the striker spring 31, which is the first to be released in the firing sequence. Ramp 72 is spaced $D + (2-1)x = D + x$ from ramp 71. Ramp 73 is spaced $D + 2x$ from ramp 72, and ramp 74 is spaced $D + 3x$ from ramp 73. Accordingly, the spring release sequence will be : (1) spring 31 by ramp 71; (2) spring 32 by ramp 72; (3) spring 33 by ramp 73; and (4) spring 34 by ramp 74.

The design of slidable bar 84 is identical to that of bar 68, and, thus, the two bars are indexed in opposite directions with respect to each other. Since each bar is indexed a total distance of 4x to fire the four associated flashlamps, a free end space of at least this distance is provided in each channel into which the bar can move. In particular, in the case of the bidirectional assembly illustrated, the staggering of lamps 21–24 with lamps 25–28 and the nesting of the reflectors of arrays 40 and 42 provides areas on the rectangular base 12 into which channels 76 and 82 may be extended to provide this free end space, as illustrated in FIG. 2.

Referring to FIGS. 3 and 5, the new position of slidable bar 68 is retained after each indexing cycle by means of a detent mechanism, which may comprise a spring loaded ball 104 engaging one of five notches 106 provided along the bottom of bar 68. The spring loaded ball 104 is retained in a cylindrical cavity 108 provided in base 12 at the bottom of channel 76. Bar 84 has a similar detent arrangement.

Accordingly, by virtue of the mechanical firing system, the ramp programming, and the detent control, the present flash assembly provides a self-contained memory function, whereby the next unused lamp in the flash sequence will always be ready for immediate triggering, even though the unit may have been removed from a camera and subsequently replaced. This is a significant advantage as compared to electrical arrays.

Although the invention has been described with respect to a specific embodiment, it will be appreciated that modifications and changes may be made by those skilled in the art without departing from the true spirit and scope of the invention. For example, the number of springs and lamps in the array may be varied, and the assembly may comprise but a single row of any reasonable plurality of lamps in lieu of the 4/4 bidirectional arrangement of the described embodiment. For example, the assembly could comprise a linear array of eight or 10 lamps all facing in the same direction. Further, the sliding bar could move from right to left, and spring release could be effected by moving the catches 62 downward, instead of lifting the strikers, e.g. by inverting each ramp for striking a projection from a flexible spring foot 60.

What I claim is:

1. A selective actuating mechanism for a photoflash lamp array; said array including a support member, a plurality of percussively-ignitable flashlamps mounted in a row on said support member, and a plurality of preenergized strikers mounted on said support member and releasable to fire said flashlamps; the selective actuating mechanism comprising, in combination:
    a longitudinal channel in said support member located parallel to said row of flashlamps;
    a slidable bar retained in said channel; and,
    means provided on said slidable bar for sequentially releasing said preenergized strikers to fire respective flashlamps of said array in response to successive indexing of said slidable bar along said channel.

2. The mechanism of claim 1 wherein the sequence of releasing said strikers is programmed by the spatial disposition of said releasing means on said slidable bar.

3. The mechanism of claim 1 wherein said strikers are mounted so that, in the preenergized condition, said strikers project beyond the periphery of said channel to overlie a portion of said slidable bar.

4. The mechanism of claim 3 wherein said releasing means comprises one or more ramps, and the sequence of releasing said strikers is programmed by the number and respective location of said ramps along the length of said slidable bar.

5. The mechanism of claim 4 wherein said strikers are evenly spaced, the number of said ramps equals the number of said strikers, each of said ramps is adapted to release a respective one of said strikers, and each successive ramp after the first is spaced $D + (n-1)x$ from its preceeding ramp in the striker release sequence, where D is the distance between strikers, $n$ is the number of the ramp in the striker release sequence, and $x$ is the distance said slidable bar translates along said channel during each indexing increment for release of a striker.

6. The mechanism of claim 1 further including a plurality of ratchet drive teeth on said slidable bar which are engagable for indexing said bar.

7. A photoflash assembly comprising, in combination:
    a substantially planar base member containing a longitudinal channel;
    a slidable bar retained in said channel;
    a plurality of percussively-ignitable flashlamp mounted in a row on said base member parallel to said channel;
    a plurality of preenergized strikers mounted on said base member and individually releasable to fire a respective one of said flashlamps; and
    means projecting from said slidable bar and adapted for selectively releasing said preenergized strikers;
    said slidable bar being operative upon translation along said channel to selectively release said strikers in a predetermined sequence by means of said projecting means to thereby fire the respectively associated flashlamps.

8. The assembly of claim 7 wherein said base member has an aperture therethrough within said channel, and further including means provided on said slidable bar which is accessible through the aperture in said base to be engaged for indexing said slidable bar along said channel, said bar being operative in response to successive indexing to sequentially release said strikers by means of said projecting means to fire respective ones of said flashlamps.

9. The assembly of claim 8 wherein the preenergized strikers mounted on said base member project beyond the periphery of said channel to overlie a portion of said slidable bar, and said means projecting from said slidable bar comprises one or more ramps linearly disposed along one side of said bar, said sequence of releasing said strikers being programmed by the number and respective location of said ramps along the length of said slidable bar.

10. The assembly of claim 9 wherein said means accessible to be engaged for indexing said slidable bar comprises a plurality of evenly spaced ratchet drive teeth, said teeth being disposed on a side of said bar diametrically opposite that on which said ramps are located, and said aperture being located at the bottom of said channel.

11. The assembly of claim 10 wherein said strikers are evenly spaced, the number of said ramps equals the number of said strikers, each of said ramps is adapted to release a respective one of said strikers, and each successive ramp after the first is spaced $D + (n-1)x$ from its preceeding ramp in the striker release sequence, where D is the distance between strikers, $n$ is the number of the ramp in the striker release sequence, and $x$ is the distance said slidable bar translates along said channel during each indexing increment for release of a striker.

12. The assembly of claim 11 wherein the pitch of said ratchet drive teeth is $x$, and the aperture in said base comprises a slot parallel to said channel and having a length of $2x$.

13. The assembly of claim 9 wherein: each of said flashlamps has a primer tube depending therefrom; said base member contains a plurality of bores each for receiving the primer tube of a respective one of said flashlamps to provide support therefor; and, each of said preenergized strikers is a portion of a folded torsion spring comprising a substantially hairpin torsional section having two segments joined by a bight, said striker portion projecting from one of said segments, a supporting foot projecting from the other of said segments and fixedly mounted on said base member, and a catch formed at the tip of said foot, said striker portion crossing said foot with said catch restraining said striker portion in a cocked condition.

14. The assembly of claim 9 further including a second row of percussively-ignitable flashlamps mounted on said base parallel to said first-mentioned row of flashlamps, a second longitudinal channel in said base member parallel to said first mentioned channel, said first and second rows of flashlamps being parallel with and disposed between said first and second channels, a second slidable bar retained in said second channel, a second plurality of preenergized strikers mounted on said base member and individually releasable to fire a respective one of the flashlamps of said second row, said second plurality of strikers projecting beyond the periphery of said second channel to overlie a portion of said second slidable bar, one or more ramps linearly disposed along one side of said second bar for selectively releasing said second plurality of preenergized strikers, a second aperture in said base member located in said second channel, and means provided on said second slidable bar which is accessible through the second aperture in said base to be engaged for indexing said slidable bar along said second channel, said second bar being operative in response to successive indexing to sequentially release said second plurality of strikers by means of the ramps on said second bar to fire respective ones of the flashlamps in said second row.

15. The assembly of claim 14 wherein said base is substantially rectangular, the flashlamps of said second row are staggered relative to the flashlamps of said first row, and said first and second slidable bars are adapted to be indexed in opposite directions, and further including first and second arrays of substantially concave reflectors located between said first and second rows of flashlamps and arranged in nested back-to-back relationship to face in opposite directions, each reflector of said first array being disposed behind a respective one of the flashlamps of said first row and each reflector of said second array being disposed behind a respective one of the flashlamps of said second row, said staggering of lamps and nesting of reflectors providing areas on said rectangular base into which said first and second channels are respectively extended to provide a free end space in each channel into which the bar retained therein can move upon being indexed.

* * * * *